Patented Sept. 7, 1954

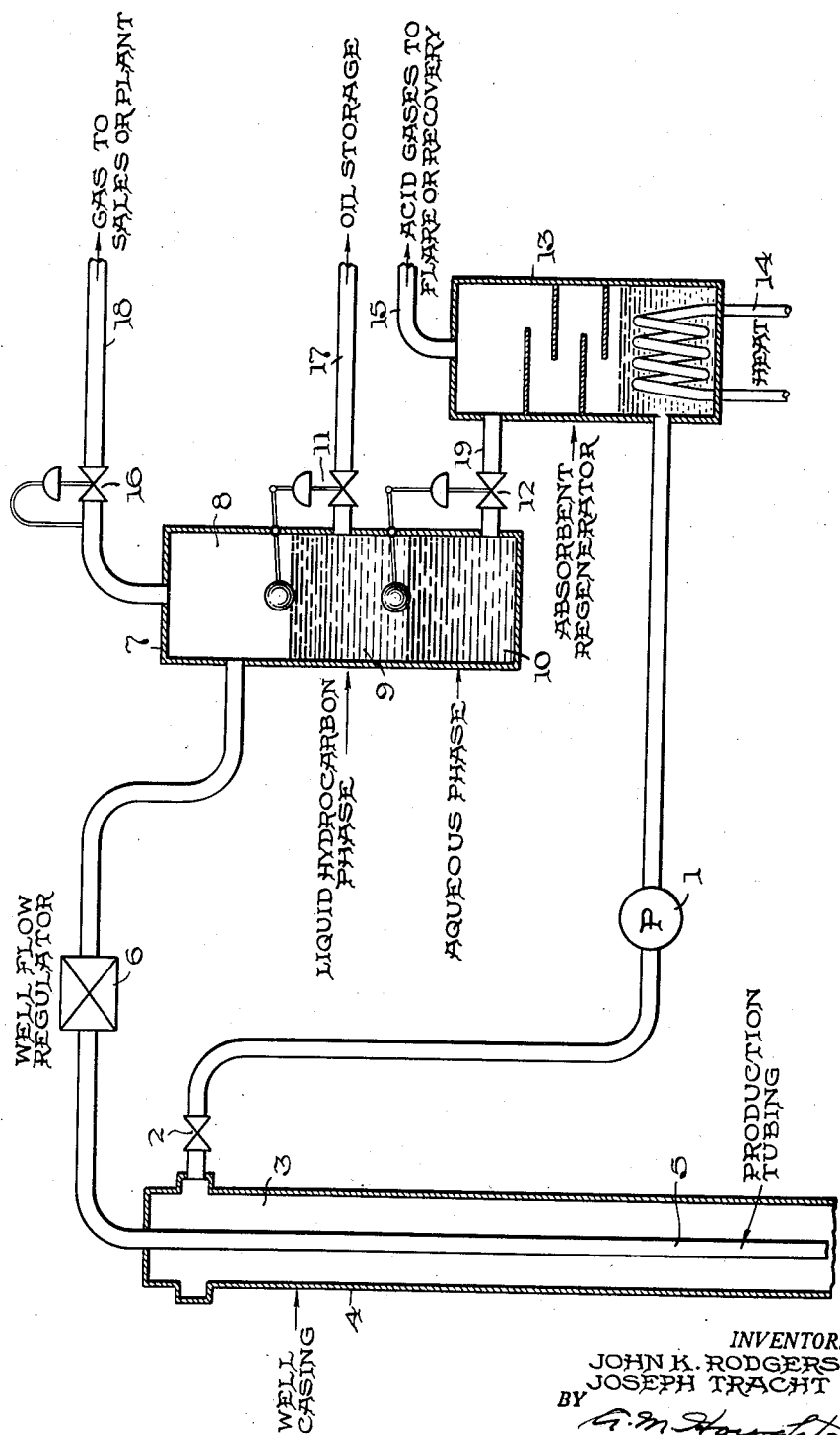

2,688,368

UNITED STATES PATENT OFFICE 2,688,368

SYSTEM FOR THE REMOVAL OF CORROSIVE FLUIDS FROM GAS WELLS

John K. Rodgers and Joseph Tracht, Pittsburgh, Pa., assignors to Gulf Research & Development Company, Pittsburgh, Pa., a corporation of Delaware Application April 28, 1950, Serial No. 158,754

2 Claims. (Cl. 166—8)

This invention relates to a method of removing corrosive fluids from oil and gas wells and more particularly to a method which may be employed to overcome the destructive action of corrosive materials in well fluids of either the "wet" or the condensate type.

The fluid produced by oil wells may vary in consistency from a thick viscous liquid to a gas. Gaseous well fluid which yields appreciable quantities of heavier hydrocarbons in liquid form is generally termed "wet" gas. The heavy hydrocarbons may be recovered in liquid form from "wet" gas by simply cooling or compressing the gas. Certain other gaseous well fluids permit the extraction of heavy hydrocarbons by a process of retrograde condensation. Wells producing such gas are generally termed condensate wells, and the liquid constituents therefrom may be obtained by expansion and reduction of pressure. Our invention is applicable particularly to wells producing "wet" gas or to wells of the condensate type, either of them being effectively treated by our invention. By the term gas as herein used is meant either the "wet" or "condensate" type of well fluid.

In addition to the hydrocarbon liquid materials recoverable from the gas by the known processes of compression with condensation, or expansion with condensation, of the gas after removal from the well, the gas may also contain certain undesirable impurities such as hydrogen sulfide, carbon dioxide and water. If hydrogen sulfide and carbon dioxide are present in the well fluid, the well equipment may be corroded severely. This necessitates the frequent and expensive replacement of the well tubing, the surface flow tubing and other surface equipment. The hydrogen sulfide and carbon dioxide may also attack the metal parts of the compressors after the well fluids are removed from the well, thus rendering use of compressors impractical and hindering the optimum recovery of liquids.

The above-mentioned compounds not only have a corrosive effect on the various metal equipment with which they come into contact, but they also render the gaseous products unsalable because of their malodorous nature and their tendency to corrode utilization equipment. Furthermore, since the above-listed undesirable components either burn very poorly or not at all, they diminish the sale value of the gas because they lower its capacity for producing heat.

Carbon dioxide and hydrogen sulfide, in addition to acting as acids in the presence of water, may be present in the well fluids in sufficient quantity so that the well fluids are so diluted with these substances as to allow the compression and condensation process to produce so small a yield of liquid hydrocarbons as to render the process commercially uneconomical.

The presence of water in well fluid is especially undesirable not only because it allows the hydrogen sulfide and carbon dioxide to act as corrosive acids, but because the water also may combine with various substances in the well fluid to form hydrocarbon hydrates which are solids and cause serious line plugging. These hydrates are solid at relatively high temperatures (sometimes in excess of 90° F.) and are troublesome to the point of being hazardous since they can plug a flow line or tubing choke, cause meters to sieze, stick a control valve and in short they make steady production very difficult and are often dangerous. Our invention prevents the formation of such hydrates by causing the water to be taken up by a chemical absorbent in a manner hereinafter described.

Serious operating problems also arise from corrosion of the well tubing by fluids containing hydrogen sulfide and carbon dioxide. Heretofore well-tubing corrosion has been prevented by the use of high-alloy tubing or by the introduction of large quantities of chemicals such as caustic soda into the well. Since alloy tubing costs several times as much as regular well tubing, this expedient is often commercially prohibitive. Furthermore, the cost of the amount of caustic soda sufficient to neutralize the acid constituents of the well fluids may run to several times the value of the liquid hydrocarbons recovered so that this expedient also may be commercially undesirable. By employing our invention the well tubing and casing is protected at greatly reduced cost in a manner hereinafter described.

In the operation of our invention the destructive action of the corrosive ingredients and the hydrate-forming action of water are overcome as soon as the gas enters the well and before these undesirable constituents can do any appreciable damage to the well or other equipment.

Corrosion of compressors has heretofore been dealt with by the use of above-ground contactor vessels, gas treating chambers or absorbers of various kinds. By employing our invention such equipment is eliminated or greatly reduced in quantity and size, thus reducing equipment costs.

It is accordingly an object of our invention to provide an economical process for removal of corrosive ingredients from well fluids which will allow the use of ordinary steel well tubing.

Another object of our invention is to greatly simplify and reduce the cost of the above-ground absorption apparatus required in the gas-treating process.

Another object of our invention is to provide a process which will eliminate the formation of troublesome hydrocarbon hydrates in well fluids.

Another object of our invention is to provide a process which will facilitate the use of lower and more efficient condensation temperatures.

Another object of our invention is to economically produce a salable "sweet" gas.

Another object of our invention is to provide a process which will allow the production of sulfur as a valuable by-product.

Another object of our invention is to provide a process which will allow the use of a cheap chemical absorbent which may easily be regenerated and used over and over.

Another object of our invention is to provide a process of protecting well casing and well tubing from the corrosive action of well fluids.

Another object of our invention is to provide a process of protecting flow lines and other well equipment from plugging by hydracorbon hydrates.

Another object of our invention is to provide a process of removing corrosive constituents from gaseous well fluid in which intimate contact with the gas is achieved without employing special contacting vessels.

These objects are accomplished by the process of our invention which comprises the steps of introducing into the well annulus a water-miscible liquid mixture adapted to chemically combine with the acidic constituents of the well fluid and also adapted to absorb the water in the well fluid. The liquid thus introduced commingles with the well fluid in the well and is returned to the surface with the well fluid through the flow tubing wherein further and complete mixing takes place as a result of the turbulent flow conditions existing during the transit of the fluids upward through the long and narrow flow tubing. When the mixture reaches the surface of the ground the then substantially non-corrosive fluids are separated into gaseous and liquid constituents, the latter being further separated into a hydrocarbon phase and an aqueous phase. The latter contains the chemically combined acidic constituents of the well fluid and the absorbed water. Thereafter the water-miscible liquid mixture may be regenerated from the aqueous phase and reintroduced into the annular space of the well whereupon it enters another similar cycle.

By the term chemical absorbent as used throughout this specification, we mean to describe the above-mentioned water-miscible liquid mixture of chemicals, one component of which will react chemically with the acidic constituents of the well fluid, and the other component of which will absorb by solution the water contained in the well fluid. Any absorbent may be used which has the properties of those specifically disclosed herein. While a two-component absorbent is generally preferred, the above-mentioned functions of the components may in some cases be adequately performed by a single chemical as hereinafter described.

In the drawing there is shown a schematic diagram of a suitable apparatus by means of which the process of our invention may be carried out.

Considering the drawing in detail, the chemical absorbent, which will be described later, is injected by a pump 1 through check valve 2 into the annular space 3 between the well casing 4 and the production tubing 5. After the chemical absorbent flows down the annulus it is picked up at the bottom of the well by the gas stream and returned to the surface through the production tubing 5. The long path up through the production tubing, which may be six inches or less in diameter and several thousand feet long, and the turbulent flow conditions therein, cause thorough contacting and intermingling of the well fluid with the introduced chemical absorbent. The entire mixture passes through a well-flow regulator 6 at the top of the well and enters a separator 7. The liquid phases of the mixture settle to the bottom of the separator leaving an upper gaseous phase 8 which is substantially free of hydrogen sulfide, carbon dioxide and water. This gas passes out through a back-pressure regulator 16 to the pipe line 18 for sale or to a further hydrocarbon-extraction plant (not shown).

The liquid phase, in turn, separates by gravity into two layers 9 and 10, the upper layer 9 being the oil phase and the lower layer 10 being the aqueous phase. The lower or aqueous phase 10 contains the chemical absorbent together with the absorbed water and combined corrosive constituents removed from the well fluid.

The oil phase 9 is drained from the separator 7 by pipe 17 through a float-controlled valve 11 to storage (not shown). This oil is substantially free of water and corrosive constituents.

The aqueous phase 10 is drained from the bottom of the separator 7 by pipe 19 through a float-controlled valve 12 and sent to a regenerator 13, to which heat 14 is supplied. The application of heat drives off the acidic gases and water, thus regenerating the original chemical absorbent which is then again picked up by the pump 1 and reintroduced into the well annulus for another cycle. The acid gases leave the top of the regenerator through pipe 15 and are either vented to the air or sent through a sulfur-recovery plant from which sulfur may be obtained as a valuable by-product.

In carrying out our process, the water-miscible liquid mixture which we have termed a chemical absorbent and which is capable of combining with the acidic constitutents hydrogen sulfide and carbon dioxide and also capable of absorbing water preferably comprises a liquid mixture of a material selected from the class of water-miscible aliphatic amines and a material selected from the class of water-miscible glycols. One or more water-soluble aliphatic amines and one or more water-miscible glycols may be used. These chemicals absorb the hydrogen sulfide, carbon dioxide and water thus leaving the well fluid substantially free of these substances. Upon reaching the regenerator 13, and being heated by means of heater 14, which may be an electrical heating element, a flame, steam coil or any other conventional means, the charge of contaminated chemical absorbent is heated to regenerate the absorbent in its original form. A gentle boiling for a short period of time is usually sufficient. During the heating process the hydrogen sulfide, carbon dioxide and water are volatilized and forced out of the regenerator 13.

By the class aliphatic amines we mean to describe a basic organic nitrogen compound in which the nitrogen atom is directly attached to a methylene (—$CH_2$—) group. The methylene group may in turn be attached to an aliphatic or aromatic group which may be either saturated or unsaturated. The nitrogen atom also may be attached to an aliphatic group which in turn may be attached to an aromatic group. The amines may be primary, secondary or tertiary. Polyamines may also be used.

Specific examples of amines which may be used are di-n-propyl amine, tri-n-propyl amine, di-n-butyl amine, tri-n-butyl amine, n-amyl amine, n-hexyl amine, n-heptyl amine, ethylene-di-amine, propylene-di-amine, and n-benzyl amine. Preferred amines are mono-, di- or tri-ethanol amine.

By the class water-miscible glycols we mean the lower di-hydroxy alcohols which are water-miscible. Examples of glycols which may be used are those having a carbon chain length of 2 to 7 in which the hydroxyl radicals may be attached to carbon atoms adjacent each other or in which the carbon atoms having the hydroxyl radical attached thereto are separated in the chain by one or more carbon atoms. Specific examples of glycols which we may employ are ethylene glycol, pentamethylene glycol, heptamethylene glycol, and propylene glycol. The lower glycol ethers, such as di- or tri-ethylene glycol, may also be employed. Ethylene glycol is particularly preferred because of its commercial availability and great affinity for water.

A mixture of suitable proportions of one or more of the above-described amines and one or more of the above glycols may be employed as the absorbent in our process. The particular proportions of the individual ingredients to be used may be varied to suit the composition of the fluids produced by the individual well. For example, the well fluids may be relatively dry, in which case only a low percentage of glycol would be required. The acidic content of the well may also be high or low and the percentage of amine is varied accordingly.

Certain of the above-disclosed amines, particularly monoethanolamine, have hygroscopic properties as well as basic properties and therefore by their use it is possible to effect both the function of reducing corrosion and the function of absorbing water. Thus, in wells whose gas carries only a limited amount of water the introduction into the annulus of monoethanolamine suffices both for reducing corrosion and reducing hydrate formation.

While we have disclosed the advantages of our method and prefer therein to treat the well fluid as completely as practicable at the bottom of the well, it is to be understood that a partial underground treatment may in many cases suffice to provide adequate corrosion protection. The corrosive action of well gases is generally a complex function of the presence of many constituents of the gas and in many instances a partial underground treatment will serve to arrest or control well corrosion to an entirely practical extent whereupon a major purification of the gas may be accomplished in above-ground equipment. Thus, a small amount of monoethanolamine may be pumped down the annular space of the well to maintain the fluids in a sufficiently alkaline state to effectively prevent corrosion, and additional glycol introduced to prevent hydrate formation as necessary, whereupon the well fluids may be further neutralized and purified at the surface. By employing our method of introducing the chemicals into the gas flow stream at the bottom of the well we are able to initiate treatment of the gas immediately when the gas comes into contact with the well equipment, and corrosion and hydrate formation is thus under control from the earliest moment thus leaving no part of the equipment (either below or above ground) open to uncontrolled reaction with the well fluids.

In some wells the temperature and pressure conditions and the composition of the well fluid are such that condensation of water occurs in the well at considerable distance above bottom. Corrosion and hydrate formation are known to take place in the presence of condensed moisture. Therefore, in such wells corrosion and hydrate formation may be controlled by introducing the reagent substantially at the level at which moisture condensation takes place, thereby conserving reagent and at the same time avoiding unnecessary back pressure on the reservoir which would otherwise result from introducing the treating materials at the very bottom of the well.

While we have illustrated a suitable apparatus which may be employed to carry out the process, we do not intend to be limited thereto. An essential and particularly desirable feature of our process arises as a result of introducing the chemical absorbent into the gas stream at the bottom of the well whereby all equipment including the well pipe itself is protected from corrosion and plugging.

By the use of our invention the subsequent condensation of liquid hydrocarbons may be carried out at advantageous low temperatures. However, our invention has many advantages which would be present whether or not low condensation temperatures are employed. Because our process eliminates hydrate formation, the separators may be operated at lower temperatures and higher pressures thus increasing the hydrocarbon liquid recovery.

One advantage of our invention is that it prevents corrosion of the well tubing and makes it unnecessary to employ expensive alloy tubing in the well.

Another advantage of our invention is that it makes use of economical, easily-regenerated chemicals as the absorbent, so that the chemicals may be recycled and used over and over with substantially no loss.

Another advantage of our invention is that the process renders the gaseous hydrocarbons more valuable because of their higher heating value, and because of the removal therefrom of foul-smelling and corrosive components.

Another advantage of our process is that it provides the operator with a source of hydrogen sulfide as a by-product from which sulfur may be manufactured. Recovery of sulfur is initiated inside the well before the sulfurous compounds can attack metal equipment in the well.

Another advantage of our process is that it protects the well tubing and casing as well as surface equipment subsequently reached by the well fluids. The drying of the gas in the lower reaches of the well eliminates the possibility of hydrate formation and its attendant dangers and difficulties.

A further advantage of our process is gained by the removal of hydrogen sulfide and carbon dioxide underground, since in this manner the partial pressures of the petroleum constituents in the gas are increased, resulting in a greater recovery of liquid hydrocarbons in the first stage of separation at the surface. Economies are thus effected due to a reduction in the amount of above-ground processing required for the efficient recovery of liquid products from the gas.

A further advantage of our process is that both gas and liquid phases of well fluid can be simultaneously treated. This eliminates multiple absorption towers on the surface for separately treating gas and liquid phases as would otherwise be required. In the case of condensate wells, an advantage is realized by our process in that the reservoir fluids are initially in the vapor state and intimate contact and reaction are more readily effected in the well than is attainable with ordinary above-ground equipment. For above-ground treatment the well fluid would exist in the liquid and gaseous states because of reduced surface pressures and temperatures, and therefore would require specialized treating equipment and a less efficient resulting treating procedure. Reconversion of the entire well fluid to the vapor phase above ground would be impracticable because of the high temperatures and pressures required to accomplish reconversion. Thus, the accomplishment of the major part of the purification of both phases in a single step is an important advantage of our invention.

Major items of equipment are eliminated by our process in which the well bore serves as the contacting means. This avoids the need for large scrubber installations on the surface. The use of glycols as dehydrating agents also eliminates the need to control hydrate formation by the use of numerous and complicated heating devices which are expensive to operate.

While we have described our process with particular reference to wells producing gas of the "wet" or of the condensate type, we do not intend to limit the invention thereto because the gradation of well fluids sometimes makes it difficult to distinguish such wells.

What we claim as our invention is:

1. A process for preventing corrosion and hydrate formation in high-pressure condensate gas wells containing a mixture of condensable liquid hydrocarbons, gaseous hydrocarbons, acidic constituents and a substantial amount of water vapor which comprises introducing a treating solution consisting essentially of a water soluble aliphatic amine and a water-soluble di-hydroxy alcohol having 2 to 7 carbon atoms in the chain into said condensate gas well, bringing a sufficient amount of said treating solution into contact with said mixture in said well substantially at the level at which water condensation takes place to combine with a substantial proportion of said acidic constituents and absorb a substantial proportion of water from said mixture, flowing said resulting mixture from said well and passing the same to a separator to separate said gaseous hydrocarbons from said resulting mixture and removing them from the separator, and separating the liquid constituents remaining in the separator into two portions, the first of said portions comprising liquid hydrocarbons and the second of said portions comprising said amine dihydroxy treating solution which contains the chemically combined acidic constituents and absorbed water.

2. The process of claim 1 wherein said second portion comprising said amine-di-hydroxy treating solution containing the chemically combined acidic constituents and absorbed water is regenerated by heating to drive off the combined acidic constituents and absorbed water and the regenerated amine-di-hydroxy treating solution is recycled to said condensate gas well.

References Cited in the file of this patent
UNITED STATES PATENTS

| Number | Name | Date |
|---|---|---|
| 2,177,068 | Hutchinson | Oct. 24, 1939 |
| 2,281,356 | Johnstone et al. | Apr. 28, 1942 |
| 2,345,713 | Moore et al. | Apr. 4, 1944 |
| 2,357,559 | Smith | Sept. 5, 1944 |
| 2,383,416 | Reed | Aug. 21, 1945 |
| 2,453,067 | Happel et al. | Nov. 2, 1948 |
| 2,496,596 | Moyer et al. | Feb. 7, 1950 |
| 2,497,954 | McCulley | Feb. 21, 1950 |
| 2,581,540 | Kennedy et al. | Jan. 8, 1952 |